Patented Dec. 12, 1922.

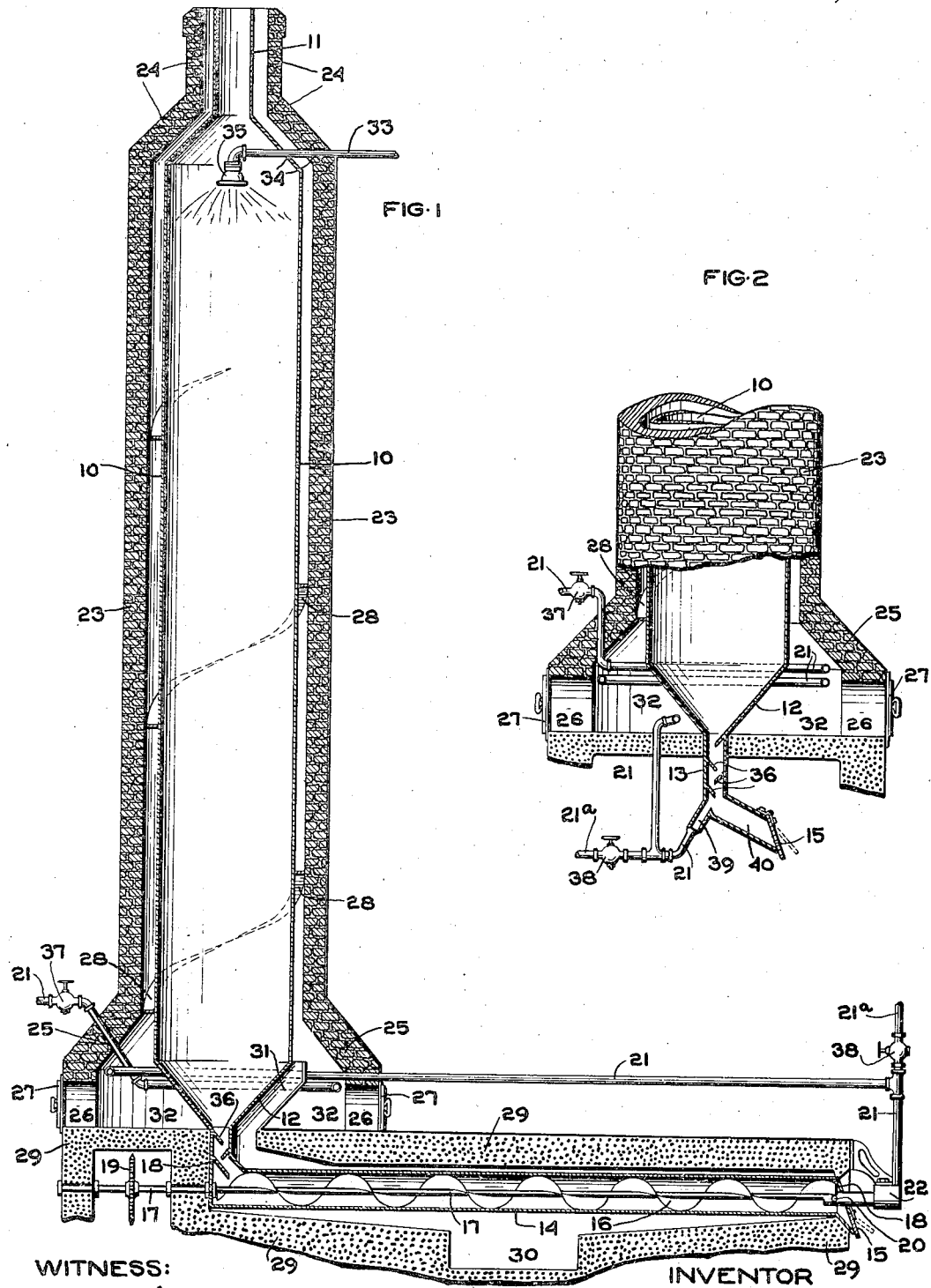

1,438,377

UNITED STATES PATENT OFFICE.

ARCHIBALD J. JEWELL, OF ST. LOUIS, MISSOURI.

PROCESS AND APPARATUS FOR THE PRODUCTION OF BARIUM PEROXIDE.

Application filed May 26, 1920. Serial No. 384,422.

*To all whom it may concern:*

Be it known that I, ARCHIBALD J. JEWELL, a citizen of the United States, residing at St. Louis, in the State of Missouri, have invented certain new and useful Improvements in Processes and Apparatus for the Production of Barium Peroxide, of which the following is a specification.

The present invention relates to the production of barium peroxide, and is particularly concerned with a novel process for its production from a barium hydrate, and with the apparatus employed for carrying out said process.

The principal object of this invention is the provision of a process and apparatus by means of which barium peroxide of a high degree of purity may be produced cheaply on a commercial scale from a barium hydrate, $Ba(OH)_2 8H_2O$.

A disclosure of the process and apparatus follows. It should, of course, be understood that the apparatus as herein shown for carrying out the process is capable of modification as to details, and the practice of the process itself might vary in some particulars without departing from the scope of the invention as set forth in the appended claims.

In the drawings—

Fig. 1 is a central vertical section of one form of the apparatus; and

Fig. 2 is a fragmentary sectional view of a modification of the apparatus, part of which view is shown in elevation.

Barium hydrate, ($Ba(OH)_2 8H_2O$) is soluble in hot water in the ratio of approximately 180 parts hydrate to 100 parts water. The hydrate loses $7H_2O$ at approximately 95° C. The remaining $1H_2O$ is driven off at about 780° C., leaving barium hydroxide ($Ba(OH)_2$). This, when heated in a current of pure air, is converted to barium peroxide, ($BaO_2$), and water, ($H_2O$).

The use of barium hydrate ($Ba(OH)_2 8H_2O$) in the production of barium peroxide ($BaO_2$) has been attended with many difficulties considered insurmountable which have prevented its employment on a commercial scale, the principal reason being that it is extremely difficult to drive off from the hydrate the water of crystallization, and, in case the water of crystallization is driven off in the ordinary way and the product converted to barium hydroxide ($Ba(OH)_2$), the resulting product is a mass so dense and heavy that it cannot be converted into peroxide ($BaO_2$) without being powdered, and in so doing sufficient moisture is again absorbed to cause the product to melt at the temperature required for peroxidizing.

I produce barium peroxide from the hydrate in the following manner:

I take a saturated solution of the hydrate, and atomize the same into a space having a temperature of 95° C. or above. The finely divided particles of the hydrate immediately lose $7H_2O$ in the form of vapor, and are then subjected to a highly increased temperature of approximately 780° C., at which temperature the remaining $1H_2O$ is driven off, leaving barium hydroxide ($Ba(OH)_2$) in a finely powdered state. Oxygen, or air which is free from moisture and carbon dioxide, is then introduced to the barium hydroxide, which is kept at a temperature of between 500° C. and 600° C., and a chemical reaction takes place therebetween forming barium peroxide and water vapor, the latter being carried off by the air current.

The above steps constituting a general outline of the process may be symbolically illustrated in the following equations:

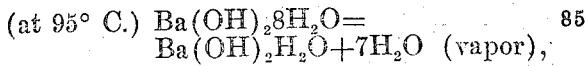

(at 95° C.) $Ba(OH)_2 8H_2O = Ba(OH)_2 H_2O + 7H_2O$ (vapor),

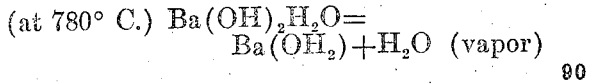

(at 780° C.) $Ba(OH)_2 H_2O = Ba(OH)_2 + H_2O$ (vapor)

and (at 600° C.) $Ba(OH)_2 + O$ (air) $= BaO_2 + H_2O$ (vapor).

It is of great importance to note that this is not a desiccation process, nor is it one of simple dehydration. It is a continuous process involving dehydration and chemical reaction in one.

In order most advantageously to employ my process in producing the peroxide on a commercial scale I preferably make use of the novel apparatus illustrated in the accompanying drawing wherein having particular reference to Fig. 1 the numeral 10 designates a tall, upright, cylindrical shell preferably constructed of iron. The upper end at the shell is contracted and formed into a narrow neck portion 11 of only sufficient diameter to permit the exhaust of air, vapor, etc. therethru. The lower end of the shell is likewise contracted into a cone-like portion 12. The neck 13 of this portion forms a passage between the shell 10 and one end of a cylindrical tube 14 which is disposed advantageously in a horizontal position beneath the lower end of the shell. A trap door 15 for the discharge of the finished product is formed in the end wall of the tube 14 opposite the neck 13, and is hinged at an angle against its seat in such a way that the door will remain closed under its own weight except as forced open by the product when discharging from within the tube.

A spiral, ribbon flight conveyer 16 rotates slowly within the tube 14. The shaft 17 upon which said conveyer is mounted is suitably journaled at either end in the end wall 18 of the tube.

Any approved means such as a sprocket wheel 19 shown in the drawing, may be employed to rotate the shaft of the conveyer 16.

The end of said shaft adjacent the trap door 15 is enlarged and hollowed out. Apertures 20 provide air passages between the hollow interior of the shaft and the tube 14. An air supply pipe 21 is in open communication with the hollow portion of shaft 17 by means of some suitable journal connection 22 therebetween.

Surrounding the previously described upright shell 10 and spaced a short distance therefrom is a cylindrical tower 23 constructed of material which is a poor conductor of heat, such as brick or the like.

The upper portion 24 of this tower is contracted to conform to the corresponding portion 11 of the shell 10 while remaining at all points equally spaced therefrom, as clearly shown in the drawing.

The lower portion 25 of the tower is enlarged in diameter in order to form sufficient furnace space between the tower and the lower contracted portion 12 of the shell. A plurality of openings 26 equipped with doors 27 permit ready access to this furnace or fire box space from the exterior of the tower for purposes of firing, etc.

A spiral baffle 28 may be interposed between the shell and tower, in order to cause more evenly graduated and thorough distribution of heat to the surface of the shell 10 from the heat source below. The contracted portion 24 of the tower functions as a chimney to withdraw the smoke and gaseous products of combustion, etc. from the space between the tower and shell.

A base 29, constructed of suitable material, supports the tower and shell, and also forms an insulating jacket about the tube 14, although spaced a short distance at all points from the cylindrical walls thereof, as clearly illustrated in Fig. 1. This space is enlarged at a point below the tube 14 to form a fire box 30 from which the surface of said tube may be heated. The space between the tube 14 and base 29 is also enlarged adjacent the contracted portion 13 of the shell in order to form a flue 31 for the exhaust of heat and smoke from the fire box 30 into the upper portion of the main fire box 32. By this arrangement the heat from the flue 31 is used to assist in heating the shell 10.

A chemical supply pipe 33 passes thru aligned apertures 34 in the sides of the tower and shell near their tops and, adjacent the axis of the shell is attached to a downwardly discharging atomizing nozzle 35.

At the bottom of the shell 10 the contracted neck passage 13 connecting the shell with the conveyer tube 14 is provided with a series of staggered baffles 36 so arranged as to permit the powdered chemical to fall from one baffle to the other, and in this way to be evenly exposed to the current of oxygen or pure air flowing past said baffles from the interior of the tube 14.

The previously mentioned air supply pipe 21 leads to the end of the conveyer tube 14 from the air or oxygen source, and intermediate these points passes in a tortuous coil thru the enlarged portion of the tower containing the fire box, whereby the air is pre-heated before entering the conveyer tube 14.

In order to provide for controlling the temperature of the air admitted to the tube 14, another pipe $21^a$ connected to the air source leads into pipe 21 near the tube 14. The pipes 21 and $21^a$ are provided with suitable valves 37 and 38 whereby the relative proportions of heated and unheated air introduced may be regulated.

Having reference to the apparatus as described my process is carried out as follows:

I add to hot water a sufficient quantity of the hydrated barium hydroxide ($Ba(OH)_2 \cdot 8H_2O$) to make a saturated solution, and pump the same at the required pressure thru the chemical supply pipe 33 and atomizing spray nozzle 35 into the top of the heated shell 10.

The temperature maintained in the shell, due to the location of the heat source and to the spiral baffle 28, ranges gradually from approximately 780° C. near the bottom to in excess of 95° C. near the top of the shell.

The hydrate, being atomized into a fine drifting spray, settles gradually downwards in the shell, and, completely loses its $7H_2O$ as vapor by the time it has descended one-half the height of said shell, which may preferably be about 30 feet tall. The resulting product having now entered the zone of higher temperatures, loses the remaining 1H$_2$O. As the product barium hydroxide (Ba(OH)$_2$) in a finely powdered form, approaches the cone-like portion 12 of the shell it is met from below by a current of air entering the shell through the baffled passage 13 from the conveyer tube 14 which air is free from moisture and carbon dioxide, and the temperature of the hydroxide being approximately between 500° C. and 600° C. a chemical change occurs and the hydroxide becomes barium peroxide and water vapor, the latter being carried upward by the current of air, and the former falling through the passage 13. In order to insure ample contact between the hydroxide and air for completion of the reaction, the baffles 36 and slowly moving conveyer 16 maintain the product in a constant state of agitation and exposure to the air current for a prolonged period before it is finally discharged from the trap door 15.

The fire box 30 maintains a constant temperature in the conveyer tube and passage 13 of approximately 600° C.

In Fig. 2 is shown the same type of apparatus but with the conveyer removed. In this form the passage 13 is bifurcated below the baffles 36 into two passages 39 and 40. The passage 39 connects with the air supply pipe 21 and the passage 40 terminates in the discharge door 15. This simplified form of the apparatus may be used where it is found that conditions permit of the thorough peroxidizing of the hydroxide without the employment of the conveyer 16.

I claim:

1. The method of producing barium peroxide which consists in subjecting hydrated barium hydroxide in a finely divided and diffused state to a temperature sufficiently high to drive off the water of crystallization, and thereafter to the action of oxygen at a temperature sufficient to peroxidize the dehydrated material.

2. The method of producing barium peroxide which consists in subjecting a solution of hydrated barium hydroxide in a finely divided and diffused spray to a temperature sufficiently high to drive off the water of crystallization, and thereafter to the action of oxygen at a temperature sufficient to peroxidize the dehydrated material.

3. The method of producing barium peroxide which consists in subjecting hydrated barium hydroxide in a finely divided and diffused state to a dehydrating temperature to produce barium hydroxide, and then subjecting the barium hydroxide to the action of oxygen at a temperature sufficiently high to peroxidize the same.

4. The method of producing barium peroxide which consists in subjecting a solution of hydrated barium hydroxide in a finely divided and diffused spray to a dehydrating temperature to produce barium hydroxide, and then subjecting the barium hydroxide to the action of oxygen at a temperature sufficiently high to peroxidize the same.

5. The method of producing barium peroxide which consists in subjecting hydrated barium hydroxide in a finely divided and diffused state progressively to a rising temperature from in excess of 95° C. to in excess of 780° C. whereby the hydrated barium hydroxide is converted into barium hydroxide, and then to the action of oxygen at a temperature of from 500° C. to 600° C. whereby to peroxidize the same.

6. The method of producing barium peroxide which consists in introducing a solution of hydrated barium hydroxide in a finely divided spray into a heated chamber and there subjecting the same progressively to a rising temperature from in excess of 95° C. to in excess of 780° C. whereby the hydrated barium hydroxide is converted into barium hydroxide, and then to agitation in the presence of oxygen at a temperature of from 500° C. to 600° C. whereby to peroxidize the same.

7. The method of producing barium peroxide which consists in spraying a solution of hydrated barium hydroxide into a heated vertical column whereby to subject the same progressively to an increasing temperature ultimately exceeding 780° C. to drive off the water of crystallization, and then subjecting the resultant barium hydroxide while in a state of agitation to the action of oxygen whereby to peroxidize the same.

8. The method of producing barium hydroxide which consists in spraying a solution of hydrated barium hydroxide into a heated vertical column whereby to subject the same progressively to an increasing temperature ultimately exceeding 780° C. to drive off the water of crystallization.

9. In an apparatus for the production of barium peroxide from hydrated barium hydroxide, a vertical shell, means independent of any heated gas passing through the shell for heating the same to a greater temperature at the bottom than at the top, a spray nozzle in the top thereof, means to supply a solution of barium hydrate to the nozzle, and means to introduce oxygen to the resultant barium hydroxide while maintained at a high temperature.

10. In an apparatus for the production of barium peroxide from hydrated barium hydroxide, a vertical shell, means independent of any heated gas passing through the shell for heating the same, a spray nozzle in the top thereof, means to supply a solution of hydrated barium hydroxide to the nozzle, a withdrawal chamber for the hydroxide, means to agitate the material therein, means to supply oxygen to the withdrawal chamber, and means to heat said chamber.

11. In an apparatus for the production of barium peroxide from hydrated barium hydroxide, a vertical shell, means disposed exteriorly of the shell for heating the same to a greater temperature at the bottom than at the top, a spray nozzle in the top thereof, means to supply a solution of barium hydrate to the nozzle, and means to introduce oxygen to the resultant barium hydroxide while maintained at a high temperature.

In testimony whereof I have hereunto signed my name in the presence of two subscribing witnesses.

ARCHIBALD J. JEWELL.

Witnesses:
O. E. WHITE,
C. FINEGAN.